US008999222B2

(12) United States Patent
Abe et al.

(10) Patent No.: US 8,999,222 B2
(45) Date of Patent: Apr. 7, 2015

(54) METHOD FOR MANUFACTURING THREE-DIMENSIONALLY SHAPED OBJECT, THREE-DIMENSIONALLY SHAPED OBJECT OBTAINED THEREBY, AND METHOD FOR MANUFACTURING MOLDED ARTICLE

(75) Inventors: Satoshi Abe, Osaka (JP); Yoshiyuki Uchinono, Osaka (JP); Isao Fuwa, Osaka (JP); Norio Yoshida, Nara (JP); Kazuho Morimoto, Kyoto (JP)

(73) Assignees: Panasonic Corporation, Osaka (JP); OPM Laboratory Co., Ltd, Kyoto (JP)

( * ) Notice: Subject to any disclaimer, the term of this patent is extended or adjusted under 35 U.S.C. 154(b) by 224 days.

(21) Appl. No.: 13/702,214

(22) PCT Filed: Jun. 9, 2011

(86) PCT No.: PCT/JP2011/063269
§ 371 (c)(1),
(2), (4) Date: Dec. 5, 2012

(87) PCT Pub. No.: WO2011/155568
PCT Pub. Date: Dec. 15, 2011

(65) Prior Publication Data
US 2013/0069282 A1    Mar. 21, 2013

(30) Foreign Application Priority Data
Jun. 9, 2010  (JP) ................................. 2010-132213

(51) Int. Cl.
*B22C 9/00* (2006.01)
*B29C 33/38* (2006.01)
(Continued)

(52) U.S. Cl.
CPC ......... *B29C 33/3842* (2013.01); *B29C 67/0077* (2013.01); *B29C 45/0025* (2013.01);
(Continued)

(58) Field of Classification Search
CPC .... B29C 45/174; B29C 33/42; B29C 33/3814
USPC ..................................... 264/497, 572, 328.16
See application file for complete search history.

(56) References Cited

U.S. PATENT DOCUMENTS 4,177,238 A * 12/1979 Allen ....................... 264/328.16
5,132,143 A    7/1992 Deckard
(Continued)

FOREIGN PATENT DOCUMENTS

CN  100336655  3/2006
CN    1976800  6/2007
(Continued)

OTHER PUBLICATIONS

U.S. Appl. No. 13/702,210 to Satoshi Abe et al., filed Dec. 5, 2012.
(Continued)

*Primary Examiner* — Jill Heitbrink
(74) *Attorney, Agent, or Firm* — Greenblum & Bernstein, P.L.C.

(57) ABSTRACT

There is provided a method for manufacturing a three-dimensional shaped object, the method comprising the repeated steps of: (i) forming a solidified layer by irradiating a predetermined portion of a powder layer with a light beam, thereby allowing a sintering of the powder in the predetermined portion or a melting and subsequent solidification thereof; and (ii) forming another solidified layer by newly forming a powder layer on the resulting solidified layer, followed by the irradiation of a predetermined portion of the powder layer with the light beam, wherein a part of a surface portion of the three-dimensional shaped object is formed as a low-density solidified portion whose solidified density ranges from 50% to 90% so that an application of pressure can be performed by a gas flowing through the low-density solidified portion.

11 Claims, 15 Drawing Sheets

(51) Int. Cl.
  *B29C 67/00* (2006.01)
  *B29C 45/00* (2006.01)
  *B22F 3/105* (2006.01)
  *B22F 3/11* (2006.01)
  *B22F 7/06* (2006.01)
  *B29C 45/17* (2006.01)

(52) U.S. Cl.
  CPC ............ *B22F3/1055* (2013.01); *B22F 3/1121* (2013.01); *B22F 7/06* (2013.01); *B22F 2999/00* (2013.01); *B29C 45/174* (2013.01); *B29C 33/3814* (2013.01)

(56) References Cited

U.S. PATENT DOCUMENTS

| | | | |
|---|---|---|---|
| 5,316,580 A | | 5/1994 | Deckard |
| 5,460,761 A | * | 10/1995 | Larsson ................ 264/39 |
| 5,542,611 A | * | 8/1996 | Hendry ................ 239/553.5 |
| 6,682,688 B1 | | 1/2004 | Higashi et al. |
| 8,187,522 B2 | | 5/2012 | Higashi et al. |
| 2004/0173945 A1 | | 9/2004 | Khoshnevis |
| 2007/0196561 A1 | | 8/2007 | Philippi et al. |
| 2008/0111271 A1 | | 5/2008 | Khoshnevis |
| 2008/0277837 A1 | * | 11/2008 | Liu et al. ................ 264/497 |
| 2009/0121393 A1 | | 5/2009 | Abe |
| 2009/0295039 A1 | | 12/2009 | Fruth et al. |
| 2010/0044547 A1 | | 2/2010 | Higashi et al. |

FOREIGN PATENT DOCUMENTS

| | | |
|---|---|---|
| CN | 1982039 | 6/2007 |
| CN | 101005939 | 7/2007 |
| CN | 101309766 | 11/2008 |
| CN | 101653827 | 2/2010 |
| JP | 01-502890 | 10/1989 |
| JP | 6-15681 | 1/1994 |
| JP | 2000-73108 | 3/2000 |
| JP | 2000-190086 | 7/2000 |
| JP | 2002-322501 | 11/2002 |
| JP | 2003-001715 | 1/2003 |
| JP | 2003-305778 | 10/2003 |
| JP | 2009-001900 | 1/2009 |
| JP | 2010-047813 | 3/2010 |
| JP | 2010-100883 | 5/2010 |
| WO | 88/02677 | 4/1988 |

OTHER PUBLICATIONS

International Preliminary Report on Patentability, mailed Jan. 24, 2013, in related International Application No. PCT/JP2011/063268.

Chinese Office Action and Search Report, dated Mar. 26, 2014, in related Chinese Application No. 201180027927.9, along with an English translation of the Search Report.

Chinese Office Action and Search Report, mailed Mar. 26, 2014, in corresponding Chinese Application No. 201180027799.8, along with an English translation of the Search Report.

Japanese Office Action, mailed Apr. 8, 2014, in related Japanese Application No. 2010-132209.

International Search Report, mailed Sep. 13, 2011, in related International Application No. PCT/JP2011/063268.

International Preliminary Report on Patentability for PCT/JP2011/063269 (Translation), mailed Jan. 15, 2013.

* cited by examiner (a)

(b)

(a)

(b)

(a)

(b)

(a)

(b)

(a)

(b)

(a)

(b)

(a)

Flowing of gas (b)

METHOD FOR MANUFACTURING THREE-DIMENSIONALLY SHAPED OBJECT, THREE-DIMENSIONALLY SHAPED OBJECT OBTAINED THEREBY, AND METHOD FOR MANUFACTURING MOLDED ARTICLE

TECHNICAL FIELD

The present invention relates to a method for manufacturing a three-dimensional shaped object, and a three-dimensional shaped object obtained thereby, and also relates to a method for manufacturing for a molded article. More particularly, the present invention relates to a method for manufacturing a three-dimensional shaped object with a plurality of solidified layers stacked integrally by repeating the step of forming a solidified layer by irradiating a predetermined portion of a powder layer with a light beam, and also relates to the three-dimensional shaped object obtained by such manufacturing method. Further, the present invention also relates to a method for manufacturing a molded article by making use of the three-dimensional shaped object as a metal mold.

BACKGROUND OF THE INVENTION

Heretofore, a method for manufacturing a three-dimensional shaped object by irradiating a powder with a light beam has been known (such method can be generally referred to as "selective laser sintering method"). Such method can produce a three-dimensional shaped object with a plurality of solidified layers stacked integrally by repeating the step (i) of forming a solidified layer by irradiating a predetermined portion of a powder layer with a light beam, thereby allowing sintering of the predetermined portion of the powder or melting and subsequent solidification thereof, and the step (ii) of forming another solidified layer by newly forming a powder layer on the resulting solidified layer, followed by similarly irradiating the powder layer with the light beam (see JP-T-01-502890 or JP-A-2000-73108). The three-dimensional shaped object thus obtained can be used as a metal mold in a case where inorganic powder materials such as a metal powder and a ceramic powder are used as the powder material. While on the other hand, the three-dimensional shaped object can be used as a model or replica in a case where organic powder materials such as a resin powder and a plastic powder are used as the powder material. This kind of technology makes it possible to produce the three-dimensional shaped object with a complicated contour shape in a short period of time.

By way of the case wherein a three-dimensional shaped object is manufactured on a base part, as shown in FIG. 1, a powder layer 22 with a predetermined thickness t1 is firstly formed on a base plate for shaped object 21 (see FIG. 1(a)) and then a predetermined portion of a powder layer 22 is irradiated with a light beam to form a solidified layer 24 Then, a powder layer 22 is newly provided on the solidified layer 24 thus formed and is irradiated again with the light beam to form another solidified layer. In this way, the solidified layer is repeatedly formed, and thereby it is possible to obtain a three-dimensional shaped object with a plurality of solidified layers 24 stacked integrally (see FIG. 1(b)).

PATENT DOCUMENTS (PRIOR ART PATENT DOCUMENTS)

PATENT DOCUMENT 1: JP-T-01-502890
PATENT DOCUMENT 2: JP-A-2000-73108

DISCLOSURE OF THE INVENTION

Problems to be Solved by the Invention

Although the three-dimensional shaped object can be used as a metal mold, a phenomenon called as "sinking (sink mark)" can occur upon a resin-molding process performed by using of the metal mold. Specifically, a thick portion or a rib portion of a molded article tends to locally sink as illustrated in FIG. 14, which results in a defective molding. While not intending to be bound by any specific theory, it is considered that such a "sinking" occurs attributed to a stress generated during the resin-molding process. More specifically, the injected resin in a molten state is allowed to be cooled down within the metal mold and thereby a solidification of the molten resin occurs from its surface, followed by a gradual solidification of the internal portion of the molten resin over time. The solidification of resin is associated with its volumetric shrinkage. In this regard, the surface of the resin is firstly solidified, causing a tensile stress within the resin. If the strength of the surface portion yields to the tensile stress, then the surface portion of the resin locally sinks.

Under these circumstances, the present invention has been created. That is, an object of the present invention is to provide a three-dimensional shaped object capable of being used as a metal mold which can contribute to a suitable prevention of the sink mark.

Means for Solving the Problems

In order to achieve the above object, the present invention provides a method for manufacturing a three-dimensional shaped object, the method comprising the repeated steps of:

(i) forming a solidified layer by irradiating a predetermined portion of a powder layer with a light beam, thereby allowing a sintering of the powder in the predetermined portion or a melting and subsequent solidification thereof; and (ii) forming another solidified layer by newly forming a powder layer on the resulting solidified layer, followed by the irradiation of a predetermined portion of the powder layer with the light beam, wherein a part of a surface portion of the three-dimensional shaped object is formed as a low-density solidified portion whose solidified density ranges from 50% to 90% so that an application of pressure can be performed by a gas flowing through the low-density solidified portion.

One of distinguishing features of the manufacturing method of the present invention is to form the low-density solidified portion in the three-dimensional shaped object by taking a use application of the three-dimensional shaped object into consideration. More specifically, according to the present invention, the low-density solidified portion whose solidified density is between 50% and 90% is formed as a part of the surface portion of the three-dimensional shaped object such that the application of pressure can be performed by a gas flowing through the low-density solidified portion.

The term "low-density solidified portion" as used herein substantially means a porous portion of the shaped object (e.g., a porous sintered portion) having a relatively low solidified density. More specifically, the term "low density" indicates a solidified density lower than that of the body of the shaped object (i.e., lower than a solidified density of about 95% to about 100%). In particular, the low-density solidified portion according to the present invention not only allows a gas to pass therethrough due to its solidified density, but also has a suitable configuration for such passing of the gas or application of pressure.

The phrase "application of pressure can be performed by a gas flowing through . . . " as used herein substantially means an embodiment wherein an applying operation of pressure is performed by making use of a pressure of the gas flowing through the low-density solidified portion. In other words, according to the present invention wherein the gas applied to one surface of the low-density solidified portion flows through the low-density solidified portion to go out from the other surface of the low-density solidified portion, the application of gas is performed by the pressure of the gas thus going out.

Describing just for confirmation, the term "powder layer" as used in this description and claims means "metal powder layer made of a metal powder", for example. Also, the term "predetermined portion of a powder layer" substantially means a portion of a three-dimensional shaped object to be manufactured. Therefore, a powder existing in such predetermined portion is irradiated with a light beam, whereby, the powder undergoes a sintering or a melting and subsequent solidification thereof to form a shape of the three-dimensional shaped object. Furthermore, the term "solidified layer" substantially means "sintered layer" and the term "solidified density" substantially means "sintered density" in a case where the powder layer is a metal powder layer.

In the manufacturing method of the present invention, it is preferable to form the low-density solidified portion having a thinner thickness in the surface portion so as to allow the gas to flow more effectively therethrough for applying a pressure to the shaped object. For example, a preferred thickness of the low-density solidified portion is in the range of about 0.5 mm to about 10 mm. This makes it possible to reduce a flow resistance upon the gas flow. In other words, a pressure loss generated upon the gas flow can be reduced, and thereby a supply pressure of the gas is prevented from being excessively lowered. As required, the low-density solidified portion may be formed such that a thickness of the low-density solidified portion may be locally different. In other words, the low-density solidified portion may be formed such that it has a thinner portion and a portion other than the thinner portion.

In one preferred embodiment, a hollow portion communicating with the low-density solidified portion is formed in the three-dimensional shaped object. The hollow portion is configured to be in communication with the outside of the shaped object. For example, "hollow space communicating with the outside of the shaped object" is formed behind the low-density solidified portion. The hollow space can be used as a gas supply path in the shaped object, in which case the gas can be supplied to the low-density solidified portion in more suitable manner. In the case of forming the hollow portion in the three-dimensional shaped object, a supporting part for supporting the low-density solidified portion having a thinner thickness may be additionally formed. For example, a solidified portion connected to the low-density solidified portion may be formed in a partial space of the hollow portion.

The number of the low-density solidified portion to be formed in the surface portion of the shaped object is not limited to one, but two or more low-density solidified portions may be formed. In this case, the solidified densities and/or the thicknesses with respect to low-density solidified portions may be different from each other. This makes it possible to cause different flow resistances regarding the gas flow through the respective ones of the low-density solidified portions of the shaped object, so that different gas pressures from each other can be applied from the respective ones of the low-density solidified portions.

The present invention also provides a three-dimensional shaped object obtained by the aforementioned manufacturing method. Such three-dimensional shaped object according to the present invention is configured to be suitably used as a metal mold. That is, at least a part of a cavity-forming surface of the metal mold is provided with a low-density solidified portion whose solidified density ranges from 50% to 90%. The three-dimensional shaped object can be used as the metal mold wherein an application of pressure with respect to a raw material for molding or a molded article can be performed by a gas flowing through the low-density solidified portion.

According to the three-dimensional shaped object of the present invention, the low-density solidified portion may be flush with the surface of the shaped object. The thickness of the low-density solidified portion is in the range of 0.5 mm to 10 mm. In one preferred embodiment, a thickness of the low-density solidified portion is locally different. For example, only local points of the low-density solidified portion are thinner at approximately regular intervals. In another preferred embodiment, a hollow portion (i.e., hollow space) which is in communication with the low-density solidified portion is provided behind the low-density solidified portion. Such hollow portion is in communication with the outside of the shaped object and thus can suitably serve as a flow path for supplying gas from the outside to the low-density solidified portion. In the space of the hollow portion, a supporting part for supporting the low-density solidified portion may be provided. In another preferred embodiment, a plurality of low-density solidified portions are provided. It is preferred that the solidified densities and/or the thicknesses with respect to the plurality of the low-density solidified portions are different from each other.

The present invention also provides a method for manufacturing a molded article by using of the three-dimensional shaped object as a metal mold. Such method for manufacturing the molded article comprises the steps of:

(i) injecting a raw resin material into a cavity of the metal mold; and (ii) subjecting the raw resin material to a molding process in the cavity of the metal mold;

wherein a pressure is applied from the outside of the cavity with respect to the raw resin material or a molded article obtained therefrom by supplying a gas via the low-density solidified portion.

In the method for manufacturing the molded article of the present invention, the pressure can be applied from the outside via the low-density solidified portion of the metal mold, and thereby an occurring of "sinking" in the raw resin material or the molded article can be effectively prevented in the cavity of the metal mold. In a preferred embodiment, the application of the pressure by the gas supply is performed in each of an injection/pressure-keeping process and a demold process. In this case, different gas pressures from each other are applied with respect to "injection/pressure-keeping process" and "demold process". In another preferred embodiment, a temperature of the raw resin material or the molded article in the cavity is adjusted by making use of a temperature of the gas flowing through the low-density solidified portion. In a case of "metal mold provided with the two or more low-density solidified portions", the pressure can be applied via each of the low-density solidified portions. Accordingly, a desired molded article can be obtained in more suitable manner.

Effect of the Invention

In accordance with the manufacturing method of the present invention, a porous low-density solidified portion capable of allowing a gas to flow therethrough is formed in a surface portion of the shaped object. Thus, the present invention makes it possible to perform a pressuring operation by the gas flowing through the low-density solidified portion, which leads to a suitable use of the three-dimensional shaped object as a metal mold. Since the low-density solidified portion is formed during the selective laser sintering process, it can be formed in any portion of the shaped object in consideration of the final use of the three-dimensional shaped object.

Specifically, assuming that the three-dimensional shaped object is used as the metal mold, the low-density solidified portion can be formed adjacent to a portion where the "sinking" may occur. Accordingly, the sink mark of the molded article can be effectively prevented from appearing during the resin molding process. In other words, since the gas can be supplied from the outside via the low-density solidified portion into the cavity of the metal mold, "sink mark" or "portion where the sink mark may appear" is pushed from the outside by the gas. With respect to a conventional metal mold, the application of the pressure is performed by forcing the gas to flow through a pipe 300 connected to the metal mold as illustrated in FIG. 15. That is, the "pipe" was used in the prior art, and thus there were relatively many limitations in that the pressure is applied only locally and the connecting pipe cannot be often installed in some portions due to a shape of a molded article to be manufactured. As for the prior-art metal mold, if the "pipe" is larger (i.e., the pipe has a larger diameter), a raw resin material may unintentionally leak into the pipe during the resin molding process, making it impossible to perform a desired molding process. To the contrary, the present invention enables to form the low-density solidified portion in any surface region of the shaped object and also to form the low-density solidified portion in any size. Namely, a relatively large pressure surface can be provided according to the present invention. Especially, even in a case where the "sink mark" or "portion where the sink mark may appear" is relatively large, a suitable metal mold can be realized wherein such large sink mark can be prevented owing to a larger area of the gas supply pressure via the low-density solidified portion. In other words, the prior-art embodiment is directed to "point pressing", whereas the present invention is directed to "surface pressing".

As described above, the low-density solidified portion according to the present invention can be formed in a relatively large size, and thereby a contact area of "gas flowing through the low-density solidified portion" and "raw resin material or the molded article provided in the cavity" can be made relatively large. Therefore, an adjustment of a temperature of the gas to be supplied to the low-density solidified portion enables an effective adjustment of the temperature of the raw resin material/molded article provided in the cavity. In other words, the present invention can not only prevent the sinking phenomenon from occurring during the resin molding process by "applying of pressure", but also prevent a weld phenomenon from occurring by "warming by gas".

Furthermore, the adjustment of the solidified density and the thickness of the low-density solidified portion can lead to a variation of a flow resistance upon the gas flow, making it possible to control the degree of the applied pressure. More specifically, the solidified density can be made lower with respect to the molded article portion where a large applied pressure is desired (e.g., a thicker portion of the molded article), whereas the solidified density may be made higher with respect to the molded article portion where little applied pressure is desired (e.g., a thinner portion of the molded article having less strength). As a result thereof, there can be obtained a larger flexibility (i.e., design flexibility) in terms of the molding process.

BRIEF DESCRIPTION OF THE DRAWINGS

FIGS. 7(a) and 7(b) are schematic views showing a general concept of the present invention wherein FIG. 7(a) illustrates that a porous low-density solidified portion 24b is formed in a part of a surface portion of the shaped object 100 and FIG. 7(b) illustrates how a hollow portion 60 is formed behind the low-density solidified portion 24b).

FIGS. 8(a) and 8(b) are schematic views of an embodiment of the present invention wherein FIG. 8(a) illustrates that the low-density solidified portion 24b is provided in a surface portion of the shaped object, the surface portion coming into contact with the "thicker portion of the molded article", and FIG. 8(b) illustrates that the low-density solidified portion 24b is provided in a surface portion of the shaped object, the surface coming into contact with the "ribs of the molded article").

FIGS. 9(a) and 9(b) are schematic views showing that the thickness of the low-density solidified portion is locally different wherein FIG. 9(a) illustrates an entire view of the low-density solidified portion and FIG. 9(b) illustrates an magnified view of the low-density solidified portion.

FIGS. 11(a) and 11(b) are perspective views schematically illustrating the three-dimensional shaped object which is used as a metal mold according to the present invention wherein FIG. 11(a) illustrates that the low density sintered portion 24b is formed in a certain region including a portion 120 where the molded article rib is formed and FIG. 11(b) illustrates that a plurality of low density sintered portions $24b_1$ through $24b_4$ are formed in a certain region which encloses the portion 120 where the molded article rib is formed.

EXPLANATION OF REFERENCE NUMERALS

Figure 1:
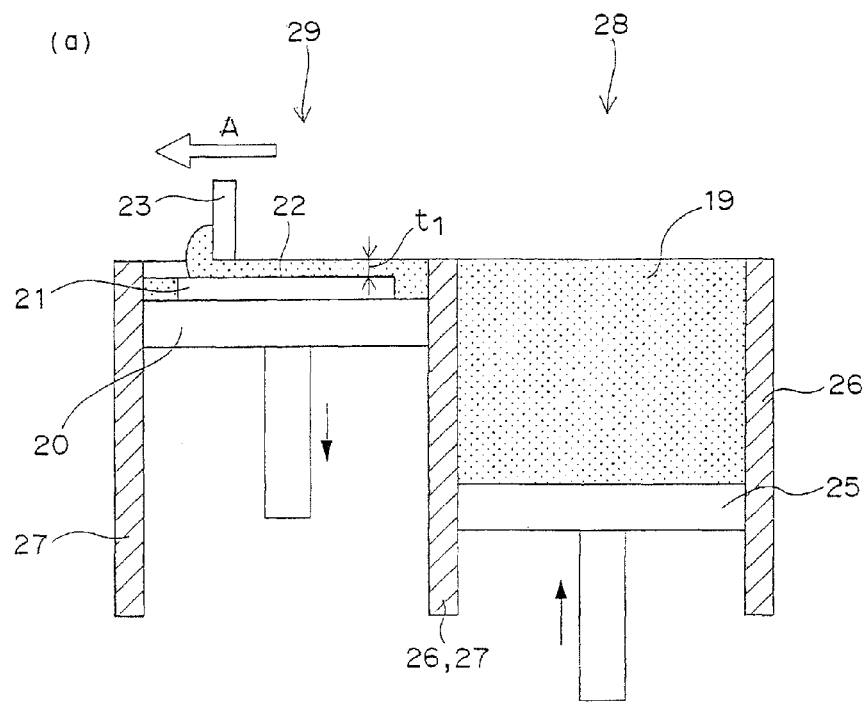
FIGS. 1(a) and 1(b) are sectional views schematically showing operations of a laser-sintering/machining hybrid machine.
Figure 1:
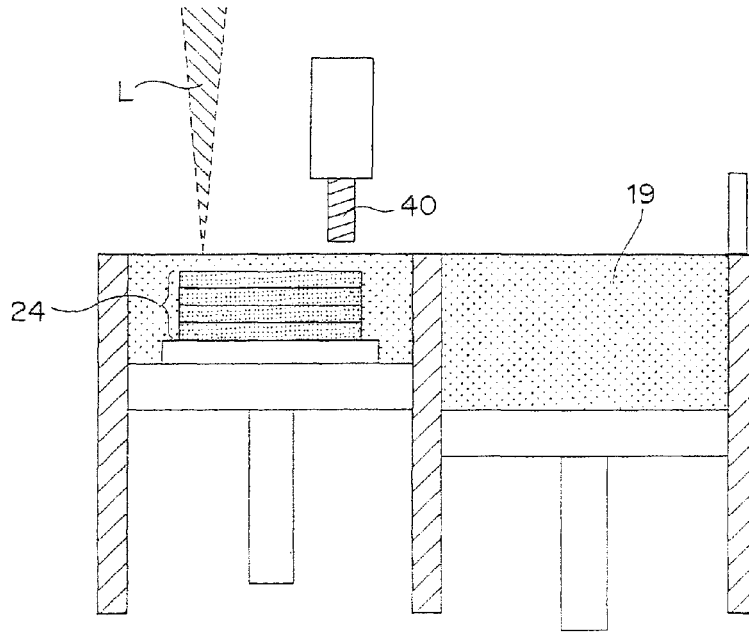

1 Laser-sintering/machining hybrid machine
2 Powder layer forming means
3 Light-beam irradiation means
4 Machining means
8 Fume
19 Powder/powder layer (e.g., metal powder/metal powder layer)
20 Forming table (supporting part for shaped object)
21 Base plate (base plate for shaped object)
22 Powder layer (e.g., metal powder layer or resin powder layer)
23 Squeegee blade
24 Solidified layer (e.g., sintered layer)
24a High-density solidified layer (e.g., high-density sintered layer)
24b Low-density solidified layer (e.g., low-density sintered layer)
$24b_1$-$24b_4$ A plurality of low-density solidified layers (e.g., a plurality of low-density sintered layers)
24c Supporting solidified portion (e.g., supporting sintered portion)
25 Powder table
26 Wall of storage tank for powder material
27 Wall of forming tank
28 Storage tank for powder material
29 Forming tank
30 Light beam generator
31 Galvanometer mirror
40 Milling head
41 X-Y actuator
50 Chamber
52 Window or lens for transmission of light
60 Hollow portion
L Light beam
100 Three-dimensional shaped object
120 Portion where a rib of molded article is formed
200 Molded article or raw resin material
202 Rib
204 Sink mark
300 Connecting pipe (Prior art)

MODES FOR CARRYING OUT THE INVENTION

Figure 2:
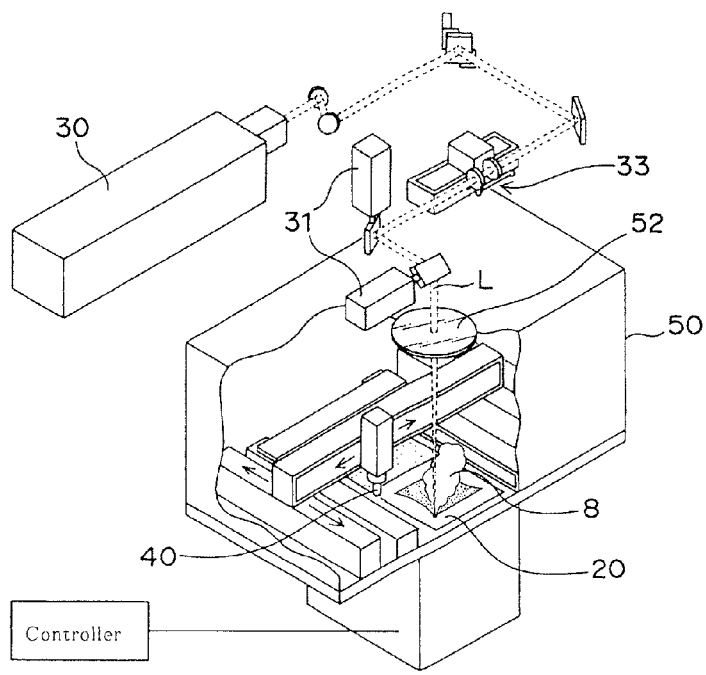
FIGS. 2(a) and 2(b) are perspective views schematically illustrating a device for performing a laser sintering (i.e., selective laser sintering method) wherein FIG. 2(a) especially shows a hybrid device with a machining mechanism, and FIG. 2(b) especially shows a device with no machining mechanism.
Figure 2:
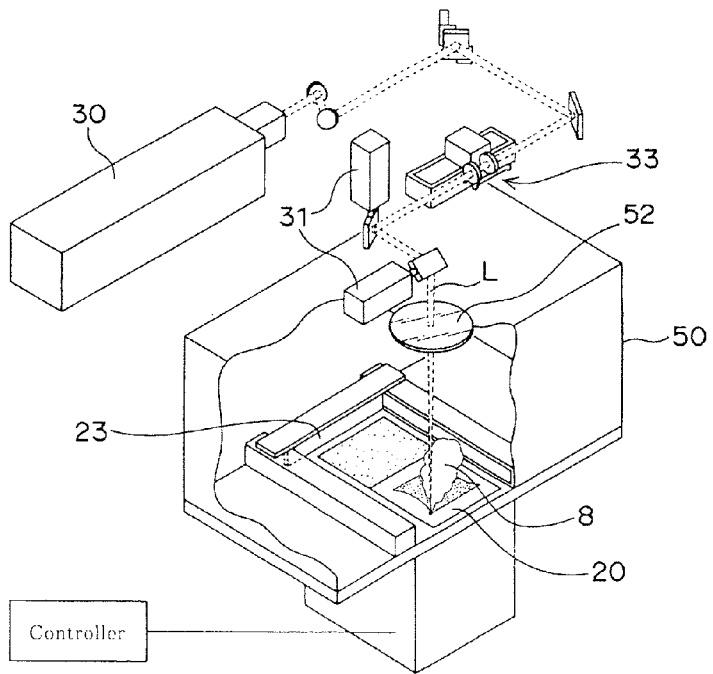
Figure 3:
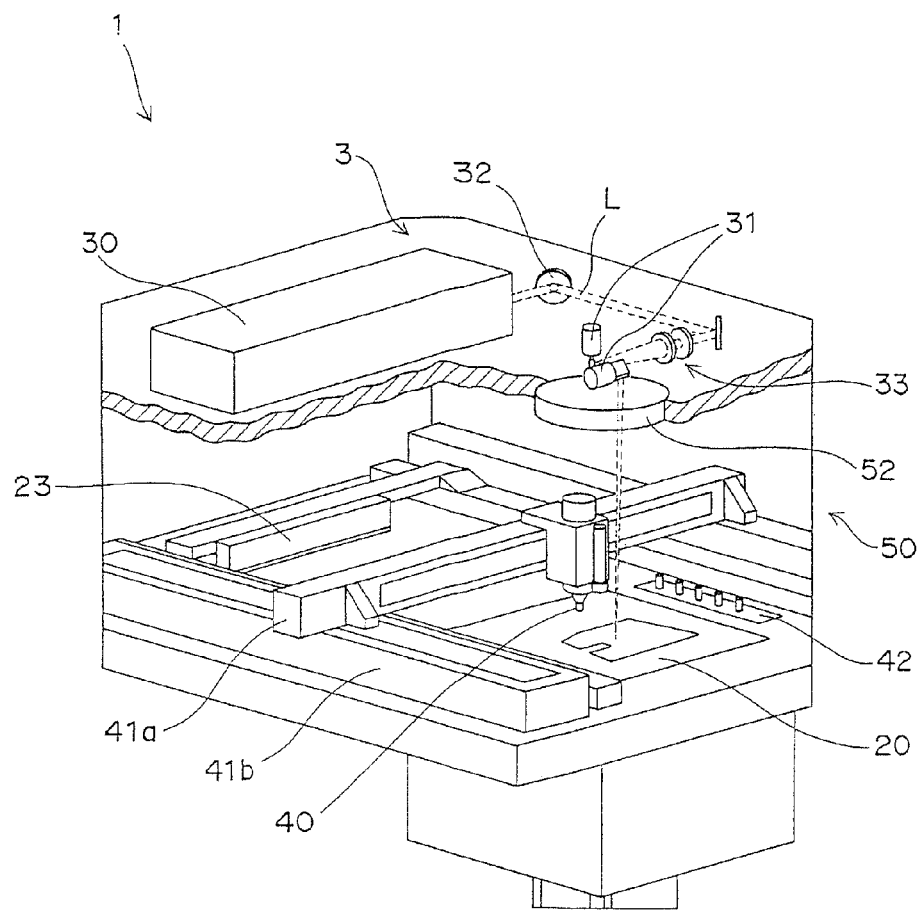
FIG. 3 is a perspective view schematically showing an embodiment in which a selective laser sintering method is carried out.
Figure 4:
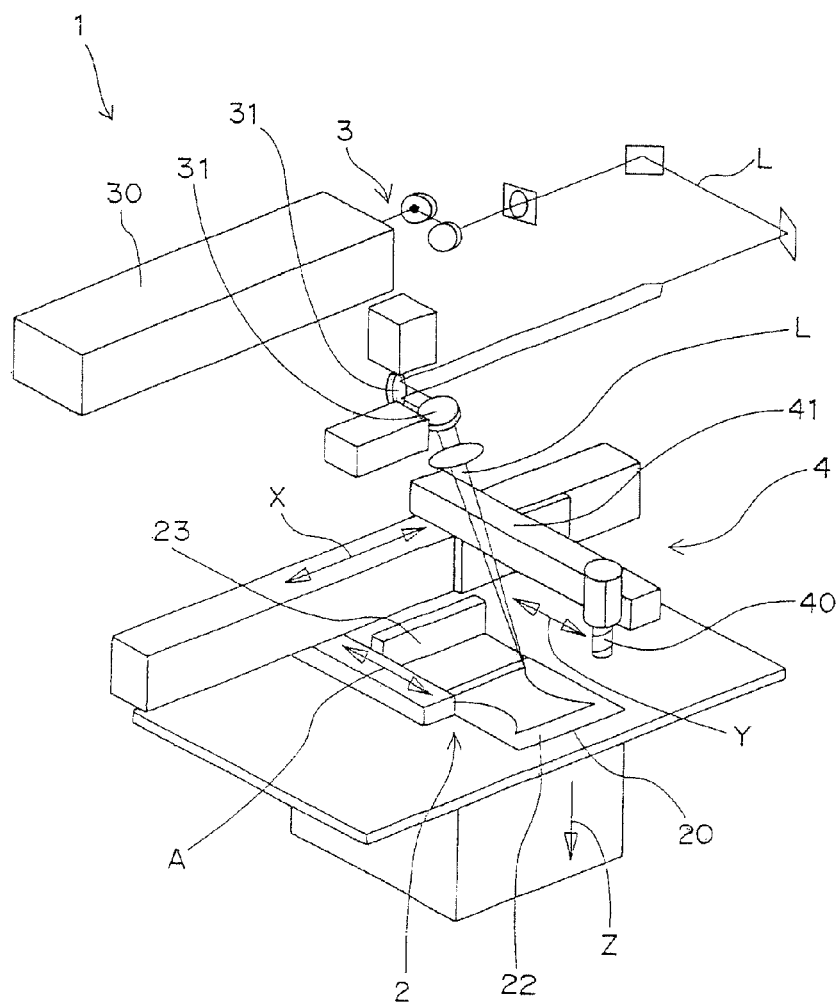
FIG. 4 is a perspective view schematically showing a constitution of a laser-sintering/machining hybrid machine by which a selective laser sintering method is carried out.

The present invention will be described in more detail with reference to the accompanying drawings.
[Selective Laser Sintering Method]
First, a selective laser sintering method, on which the manufacturing method of the present invention is based, will be described. For convenience, the selective laser sintering method, which will be described, is one where powder material is supplied from a storage tank therefor, followed by being flattened by means of a squeegee blade to form a powder layer therefrom. Moreover, by way of example, the selective laser sintering method wherein a machining process is additionally carried out with respect to the shaped object (i.e., the method embodiment shown in FIG. 2(a), not FIG. 2(b)) will be described. FIGS. 1, 3 and 4 show functions and constitutions, which enable execution of the selective laser sintering method, of a metal laser sintering hybrid milling machine. The laser-sintering/milling hybrid machine 1 is mainly provided with a "powder layer forming means 2 for forming a powder layer by providing a powder such as a metal powder or a resin powder in a predetermined thickness"; a "forming table 20 which is capable of vertically elevating/descending by cylinder drive in a forming tank 29 whose outer periphery is surrounded with a wall 27"; a "base plate for shaped object 21 which is disposed on the forming table 20 and serves as a platform of a shaped object"; a "light-beam irradiation means 3 for irradiating a desired position with an emitted light beam L"; and a "machining means 4 for milling the periphery of a shaped object". As shown in FIG. 1, the powder layer forming means 2 is mainly composed of a "powder table 25 capable of vertically elevating/descending by cylinder drive in a storage tank for powder material 28 whose outer periphery is surrounded with a wall 26" and a "squeegee blade 23 for forming a powder layer 22 on a base plate for shaped object or forming table". As shown in FIG. 3 and FIG. 4, the light-beam irradiation means 3 is mainly composed of a "light beam generator 30 for emitting a light beam L" and a "galvanometer mirror 31 (scan optical system) for scanning a light beam L onto a powder layer 22". Optionally, the light-beam irradiation means 3 is equipped with a beam shape correcting means for correcting a shape of a light beam spot (e.g., a means composed of a pair of cylindrical lens and a rotation drive mechanism for rotating the lens around a shaft line of the light beam) and fθ lens. The machining means 4 is mainly composed of a "milling head 40 for milling the periphery of a shaped object" and an "X-Y actuator 41 (41a, 41b) for driving the milling head 40 to move toward the position to be milled" (see FIG. 3 and FIG. 4).

Figure 5:
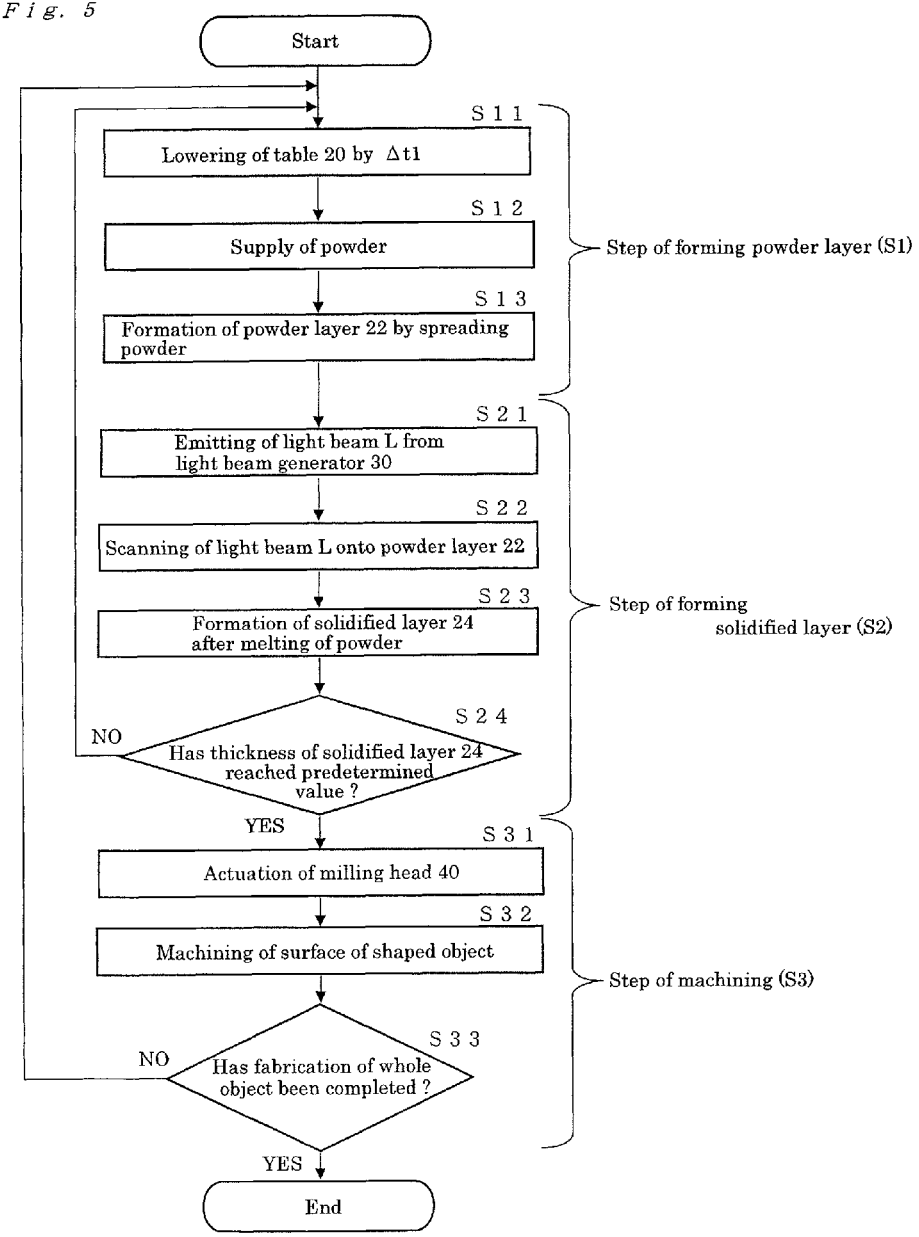
FIG. 5 is a flow chart of operations of a laser-sintering/machining hybrid machine.
Figure 6:
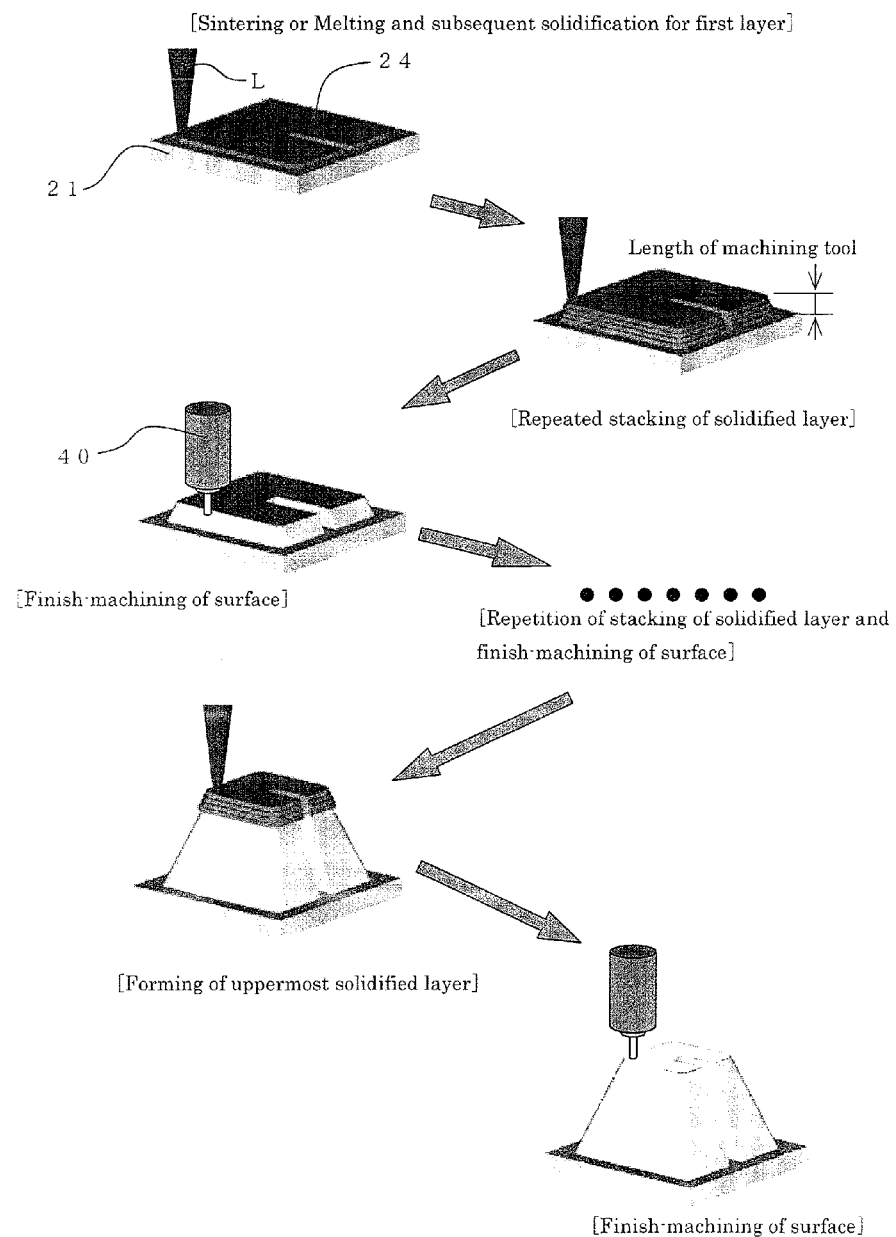
FIG. 6 is a schematic view showing a laser-sintering/machining hybrid process over time.

Operations of the metal laser sintering hybrid milling machine 1 will be described in detail with reference to FIG. 1, FIG. 5 and FIG. 6. FIG. 5 shows a general operation flow of a metal laser sintering hybrid milling machine. FIG. 6 schematically and simply shows a laser-sintering/machining hybrid process.

The operations of the metal laser sintering hybrid milling machine are mainly composed of a powder layer forming step (S1) of forming a powder layer 22; a solidified layer forming step (S2) of irradiating the powder layer 22 with a light beam L to form a solidified layer 24; and a machining step (S3) of milling a surface of a shaped object. In the powder layer forming step (S1), first, the forming table 20 is descended by Δt1 (S11). Subsequently, a powder table 25 is elevated by Δt1, and thereafter the squeegee blade 23 is driven to move in the direction of arrow "A" as shown in FIG. 1(a). Whereby, a powder (e.g., an "iron powder having a mean particle diameter of about 5 μm to 100 μm") placed on the powder table 25 is spread to form a powder layer 22 in a predetermined thickness Δt1 (S13), while being transferred onto the base plate 21 (S12). Following this step, the solidified layer forming step (S2) is performed. In this the solidified layer forming step, a light beam L (e.g., carbon dioxide gas laser (500 W), Nd:YAG laser (500 W), fiber laser (500 W) or ultraviolet light) is emitted from the light beam generator 30 (S21) and then a light beam L is scanned onto a desired position of the powder layer 22 by means of the galvanometer mirror 31 (S22). The scanned light beam can cause the powder to be melted and solidified, resulting in a formation of the solidified layer 24 integrated with the base plate 21 (S23). There is not limitation on transmission of the light beam in air, and the light beam may also be transmitted through an optical fiber or the like.

The powder layer forming step (S1) and the solidified layer forming step (S2) are repeatedly performed until the thickness of the stacked layers 24 reaches such a predetermined value that is obtained based on a tool length of the milling head 40 (see FIG. 1(b)). Upon a sintering of the powder or a melting and subsequent solidification of the powder, the newly stacked solidified layer is integrated with the lower solidified layer which has already been formed.

When the thickness of the stacked solidified layers 24 reaches a predetermined thickness, the machining step (S3) is initiated. In the embodiments as shown in FIG. 1 and FIG. 6, the milling head 40 is actuated to initiate execution of the machining step (S31). For example, in a case where the tool (ball end mill) of the milling head 40 has a diameter of 1 mm and an effective milling length of 3 mm, a milling in a depth of 3 mm can be performed. Therefore, when AU is 0.05 mm, the milling head 40 is actuated when sixty solidified layers are formed. The milling head 40 is moved in X and Y directions by means of the X-Y actuator 41 (41a, 41b) and the shaped object composed of stacked solidified layers 24 is subjected to the surface machining (S32). When the entire three-dimensional shaped object has not yet been manufactured, the step returns to the powder layer forming step (S1). Thereafter, the steps S1 through S3 are repeatedly performed to further stack the solidified layers 24, and thereby making it possible to manufacture the desired three-dimensional shaped object (see FIG. 6).

An irradiation path of the light beam L in the solidified layer forming step (S2) and a milling path in the machining step (S3) are determined in advance using 3-D CAD data. In this case, the machining path is determined by applying contour line processing. For example, in the solidified layer forming step (S2), the contour shape data of each of sliced sections, which are regularly-pitched (e.g., 0.05 mm pitch when Δt1 is 0.05 mm) sliced sections of STL data produced from a 3-D CAD model, are used.

[Manufacturing Method of the Present Invention]

Figure 7:
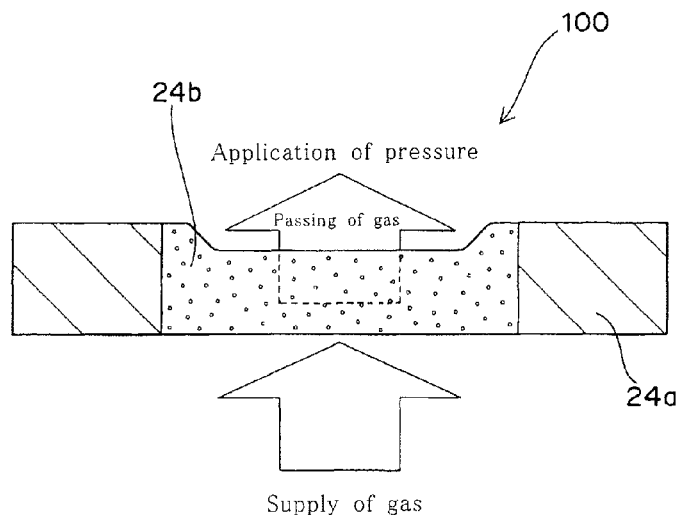
Figure 7:
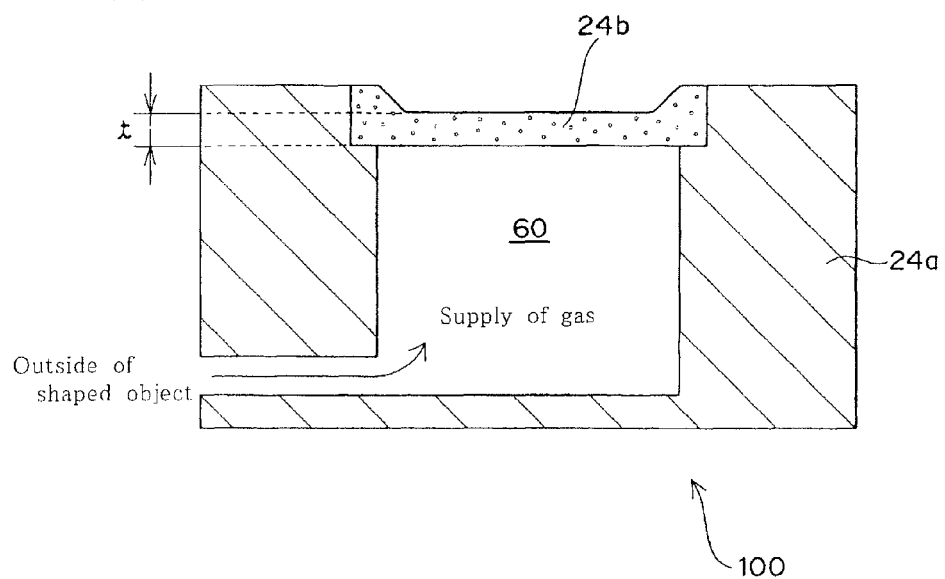

The present invention is particularly characterized by a forming process of a solidified layer in the above described selective laser sintering method. Specifically, a porous low-density solidified portion 24b is formed in a part of a surface portion of the shaped object 100 as illustrated in FIG. 7(a). In the present invention, the solidified density of the low-density solidified portion is set to a value of between 50% and 90%, preferably between 60% and 85% so as to allow the gas flowing through the low-density solidified portion 24b to apply pressure. For more efficient gas supply, a "flow path for guiding the gas to the low-density solidified portion" may be provided. Specifically, a hollow portion (i.e., a hollow space) which is in communication with the low-density solidified portion may be formed. For example, a hollow portion 60 is formed on a back surface side of the low-density solidified portion 24b such that the hollow portion 60 is in communication with the outside of the shaped object as illustrated in FIG. 7(b). Accordingly, the hollow portion 60 can be used as a gas supply path. In this regard, a supplying of the gas to the hollow portion 60 from the outside can lead to a conveyance of the gas to the low-density solidified portion 24b. As a result thereof, an application of gas pressure via the low-density solidified portion 24b can be performed with ease.

The present invention will be further described with reference to the attached drawings. The metal powder used in the present invention may be a powder containing an iron based powder as a main component, and may be a powder which further contains at least one kind powder selected from the group consisting of a nickel powder, a nickel based alloy powder, a copper powder, a copper based alloy powder and a graphite powder in some cases. Examples of the metal powder include a metal powder in which the proportion of an iron based powder having a mean particle diameter of about 20 μm is 60 to 90% by weight, the proportion of both or either of a nickel powder and a nickel based alloy powder is 5 to 35% by weight, the proportion of both or either of a copper powder and/or a copper based alloy powder is 5 to 15% by weight, and the proportion of a graphite powder is 0.2 to 0.8% by weight. The metal powder is not particularly limited to the iron based powder, but copper based powder or aluminum powder may be used. Moreover, plastic powder or ceramic powder may also be used as long as the three-dimensional shaped object is used not as a metal mold, but as a pressing part.

In the manufacturing method of the present invention, a step of forming a metal powder layer 22 with its predetermined thickness on a base plate 21 and a step of irradiating a predetermined portion of the metal powder layer 22 with a light beam to form a sintered layer from the irradiated portion of the metal powder layer (see, FIGS. 1(a) and 1(b)) are repeated. During such repeated steps, the porous low-density sintered portion 24b is formed for example by adjusting the irradiation energy of the light beam. Specifically, the output energy of the light beam to be irradiated on the powder portion corresponding to a position of the desired low-density sintered portion (i.e., "low-density solidified portion") in the metal powder layer 22 is decreased, and thereby causing an unsatisfactory sintering of the powder to occur, which leads to a formation of a solidified portion having a low density, i.e., having a low sintered density (i.e., low solidified density) of about 50% to about 90%. It should be recognized that the sintered density of the sintered layer portion 24 other than the low-density portion is in the range of 90% (excluding 90) to 100%. As described above, the formed porous sintered portion having low sintered density makes it possible for gas to flow therethrough, and thereby an application of the pressure due to the gas flow can be performed in the shaped object. The low-density sintered portion 24b can be formed by the light beam irradiation having a less energy than that of the light beam irradiation for forming a normal sintered layer. Specifically, the low-density sintered portion 24b can be formed by, in addition to (a) decreasing the output energy of the light beam, (b) increasing a scanning rate of the light beam, (c) enlarging a scanning pitch of the light beam, and (d) increasing a condensing diameter of the light beam. The aforementioned operations (a) to (d) may be performed alone, or performed in combination. Especially with respect to the aforementioned operation (a) for example, the low-density portion 24b whose sintered density is 50% to 90% can be formed by adjusting an irradiation energy density E of the light beam in a range from about 1 J/mm$^2$ to about 4 J/mm$^2$, whereas the normal sintered layer 24 whose sintered density is 90 to 100% can be formed by adjusting the irradiation energy density E of the light beam in a range from about 4 J/mm$^2$ to about 15 J/mm$^2$. It should be noted that Energy density E=Laser output power (W)/(Scanning rate (mm/s)× Scanning pitch (mm)) wherein the manufacturing condition is as follows: Powder layer thickness: 0.05 mm, Laser; CO$_2$ Laser (Carbon dioxide laser), Spot diameter: 0.5 mm.

As used in this description and claims, the term "sintered density" substantially means a sintered sectional density (occupation ratio of a metallic material) determined by image processing of a sectional photograph of the shaped object. Image processing software for determining the sintered sectional density is Scion Image ver. 4.0.2 (freeware). In such case, it is possible to determine a sintered sectional density $\rho_s$ from the below-mentioned equation 1 by binarizing a sectional image into a sintered portion (white) and a vacancy portion (black), and then counting all picture element numbers Px$_{all}$ of the image and picture element number Px$_{white}$ of the sintered portion (white).

$$\rho_S = \frac{Px_{white}}{Px_{all}} \times 100(\%) \qquad \text{[Equation 1]}$$

Figure 8:
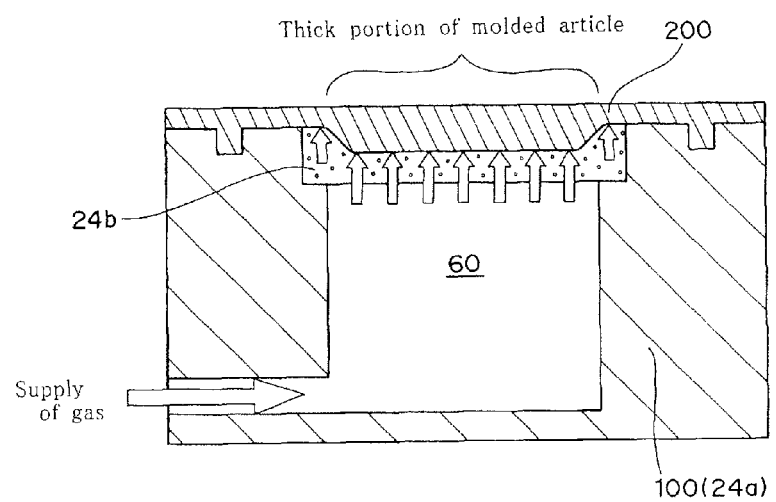
Figure 8:
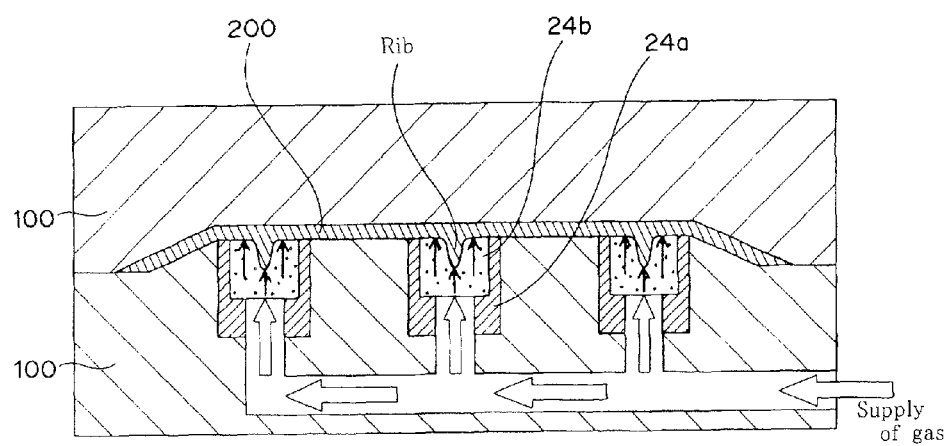

The low-density sintered portion is formed in the surface portion of the shaped object. In this regard, it is particularly preferable in the present invention to provide the low-density sintered portion in a cavity-forming surface of the metal mold where the "sinking" tends to occur. In other words, it is preferred in a case where the three-dimensional shaped object is used as a metal mold for resin molding that the low-density sintered portion 24b is formed in a cavity-forming surface with which "thick portion of the molded article" makes contact (see, FIG. 8(a)), or formed in a cavity-forming surface with which "rib of the molded article" makes contact (see, FIG. 8(b)). Accordingly, the gas pressure can be applied to the raw resin material/molded article from the low-density sintered portion 24b at a point in time after the injection molding process, resulting in an effective prevention of the occurring of "sinking". As seen from FIGS. 8(a) and 8(b), the present invention makes it possible to apply the pressure to relatively wide area of a required region, and thereby more accurate molding can be achieved. In other words, "surface pressing", not "point pressing", can be performed in the present invention. As a mere example, in a case where the three-dimensional shaped object is used as a metal mold, 10% to 100% of the cavity-forming surface can be formed as the low-density sintered portion, and preferably 20% to 70% of the cavity-forming surface can be formed as the low-density sintered portion.

With respect to the formation of the "hollow portion (i.e., hollow space) communicating with the low-density solidified portion", the present invention will be described below. The "hollow portion communicating with the low-density solidified portion" can also be formed upon the irradiation of the light beam in a similar manner as the case of the low-density solidified portion. Specifically, the "hollow portion communicating with the low-density solidified portion" can be formed through dividing a powder portion into a sub-portion where the light beam irradiation is performed and another sub-portion where no light beam irradiation is performed when the sintered layer 24 is formed. In other words, a powder region corresponding to the hollow portion 60 in the metal powder layer 22 is not irradiated with the light beam but is left as it is and thereafter the powder remaining in such region is finally removed to form the hollow portion 60. If the unsintered powder adheres on a wall surface which provides the hollow portion 60, such unsintered powder may be removed by a machining process. A suitable means used for the machining process may be any means as long as it performs a surface machining. For example, a machining means of the above-described metal laser sintering hybrid milling machine can be used (see, FIG. 2(a)). Just as an example, the used machining means is a numerical control (NC: Numerical Control) machine tool or those analogous thereto. More specifically, it is preferably a machining center (MC) whose milling tool (end mill) is automatically exchangeable. As the end mill, for example, a twin bladed ball end mill of a super-hard material is mainly used. A square end mill, a radius end mill, a drill or the like may also be used as necessary.

Figure 9:
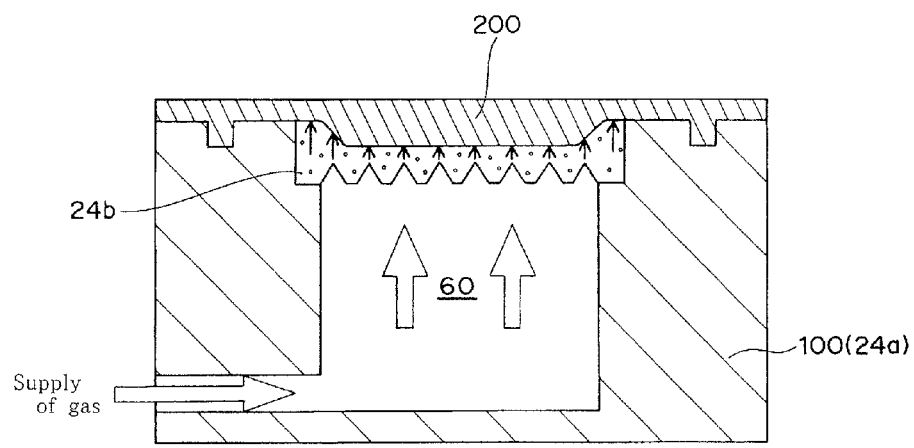
Figure 9:
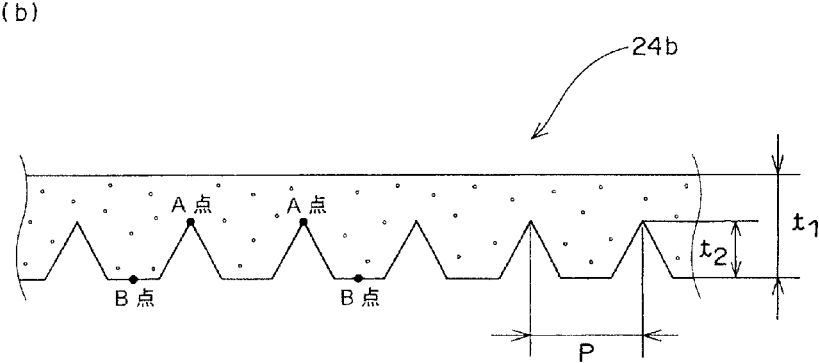

It is preferred that the low density sintered portion is provided in a relatively thin form in order to achieve a suitable "pressure application by the gas flow". In other words, the thinness of the low-density sintered portion is preferred in order for a pressure loss upon the gas flow through the low-density sintered portion to be as small as possible while keeping a necessary strength of the shaped object. For example, a thickness "t" of the low-density sintered portion 24b as illustrated in FIG. 7(b) is preferably in the range of 0.5 mm to 10 mm, more preferably in the approximate range of 1 mm to 5 mm. Regarding the thickness of the low-density sintered portion, it may be different locally or partially. For example, as illustrated in FIGS. 9(a) and 9(b), the thickness of the low-density solidified portion 24b may be varied so as to be decreased at regular intervals. A description thereof is made below with reference to FIG. 9(b). At thinner "point A" of the low-density sintered portion, the flow resistance upon the gas flow therethrough is lowered, thereby achieving an easier supply of the gas pressure with respect to the raw resin material/molded article. On the other hand, a necessary strength for the low-density sintered portion can be ensured at thicker "point B" of the low-density sintered portion. As illustrated in FIG. 9(b), the thickness of the low-density sintered portion is decreased at regular intervals, and thereby an "irregularity" of gas supply via the low-density solidified portion can be suppressed, which leads to a uniform pressuring. As a mere example, the thickness "t1" shown in FIG. 9(b) is in the approximate range of 1 mm to 10 mm, the thickness "t2" is in the approximate range of 0.5 mm to 5 mm, and a pitch "P" is in the approximate range of 1 mm to 10 mm.

Figure 10:
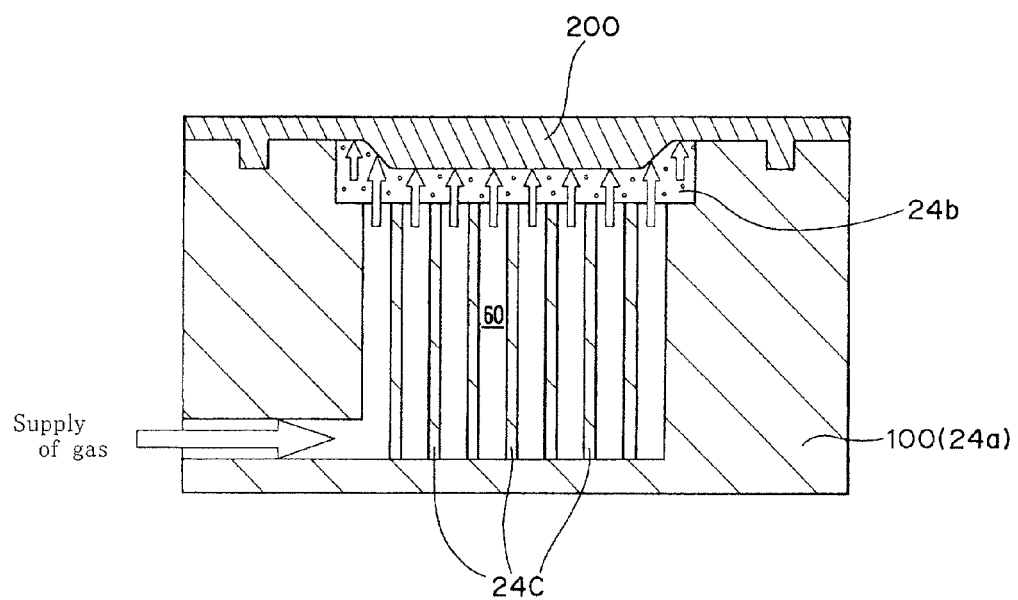
FIG. 10 is a schematic view showing that the solidified portions for supporting 24c are provided.

As the low-density sintered portion becomes thinner, the strength thereof can be lowered. Therefore, in order to reinforce the thinner low-density sintered portion, a supporting member for supporting the low density sintered portion (i.e., "reinforcing beam") may be provided. Specifically, as illustrated in FIG. 10, it is preferable to form the sintered portion 24c (i.e., the "solidified portions") which supports the low-density sintered portion 24b, the sintered portion 24c being provided in a part of the hollow region 60, and being connected to the low-density sintered portion 24b. In this case, it is preferred to provide a plurality of sintered portions 24c (i.e., a "local solidified portion") at regular intervals, as illustrated. Accordingly, a gas supply path can be ensured while providing a uniform support with respect to the low-density sintered portion 24b. The sintered portions 24c can be formed upon the light beam irradiation. Specifically, the sintered portion 24c can be formed through dividing a powder portion into a sub-portion where the light beam irradiation is performed and another sub-portion where no light beam irradiation is performed when the sintered layer 24 is formed. In other words, a powder region corresponding to the hollow portion 60 in the metal powder layer 22 is not irradiated with the light beam but is left as it is, whereas another powder region corresponding to the sintered portion 24c is irradiated with a light beam (i.e., such another powder region is irradiated with a light beam in a similar manner as in a case of forming the sintered layer 24). Thereafter the powder remaining in the region has been not irradiated is finally removed, and thereby the "sintered portion 24c disposed partially in the hollow portion 60" is provided. If the unsintered powder adheres on the sintered portion 24c, such unsintered powder may be removed by a machining process. A means used for the machining process may be any suitable means as long as it performs a surface machining. For example, a machining means of the above-described metal laser sintering hybrid milling machine can be used.

The number of the low-density sintered portion to be formed in the surface portion of the shaped object is not limited to one, but two or more low-density sintered portions may be formed. In this case, the sintered densities and/or the thicknesses regarding the low-density sintered portions may be different from each other. This makes it possible to cause different flow resistances upon the gas flow through the low-density sintered portions of the shaped object, so that different gas pressures from each other can be applied from the low-density sintered portions. For example, the sintered density can be made lower with respect to the molded article portion where a large applied pressure is desired (e.g., a thicker portion of the molded article), whereas the sintered density may be made higher with respect to the molded article portion where little applied pressure is desired (e.g., a thinner portion of the molded article having less strength). As a result thereof, there can be obtained a desired molded article having a desired high accuracy of profile.

[Three-Dimensional Shaped Object of the Present Invention]

The three-dimensional shaped object of the present invention obtained by the above manufacturing method will be now described. The three-dimensional shaped object of the present invention can be used as a metal mold of the core side or the cavity side wherein at least a part of a cavity-forming surface of the metal mold is provided with a low-density sintered portion whose sintered density ranges from 50% to 90% (preferably from 60% to 85%). Therefore, when the three-dimensional shaped object of the present invention is used as a metal mold for the resin molding process, the pressure can be applied to the raw material or the molded article from the outside thereof by the gas flowing through the low-density sintered portion. Though it has already described in the above [Manufacturing Method of the Present Invention], the three-dimensional shaped object of the present invention has a suitable configuration as exemplified below.

The hollow portion which is in communication with the low-density sintered portion is provided at a back surface side of the low-density sintered portion. In particular, such hollow portion is in communication with the outside of the shaped object (see, FIG. 8);

The supporting sintered portion 24c is provided for supporting the low-density sintered portion 24b in the hollow portion (see FIG. 10);

The low-density sintered portion has locally different thicknesses (see, FIG. 9); and Two or more low-density sintered portions are provided. For example, the sintered density and/or the thickness are/is different from each other with respect to the respective ones of the low density sintered portions.

Figure 11:
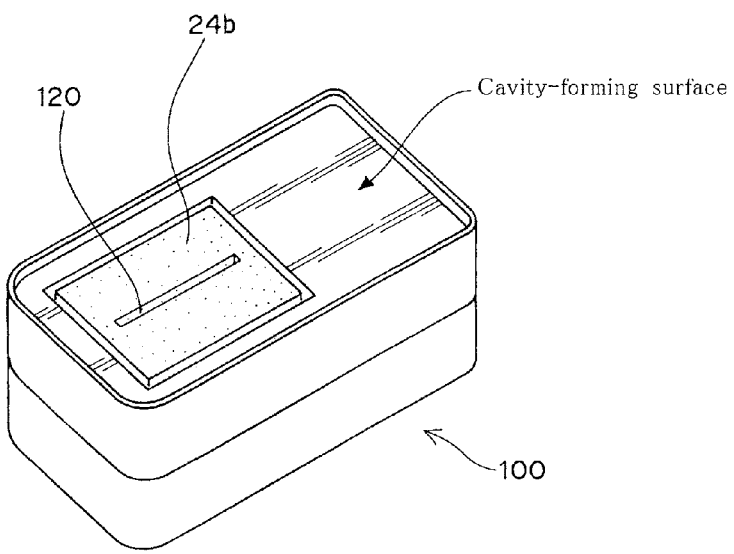
Figure 11:
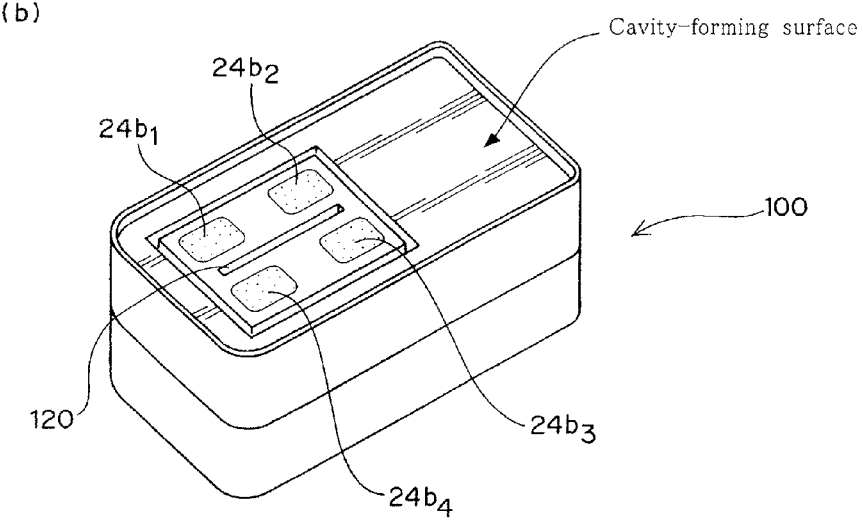
Figure 12:
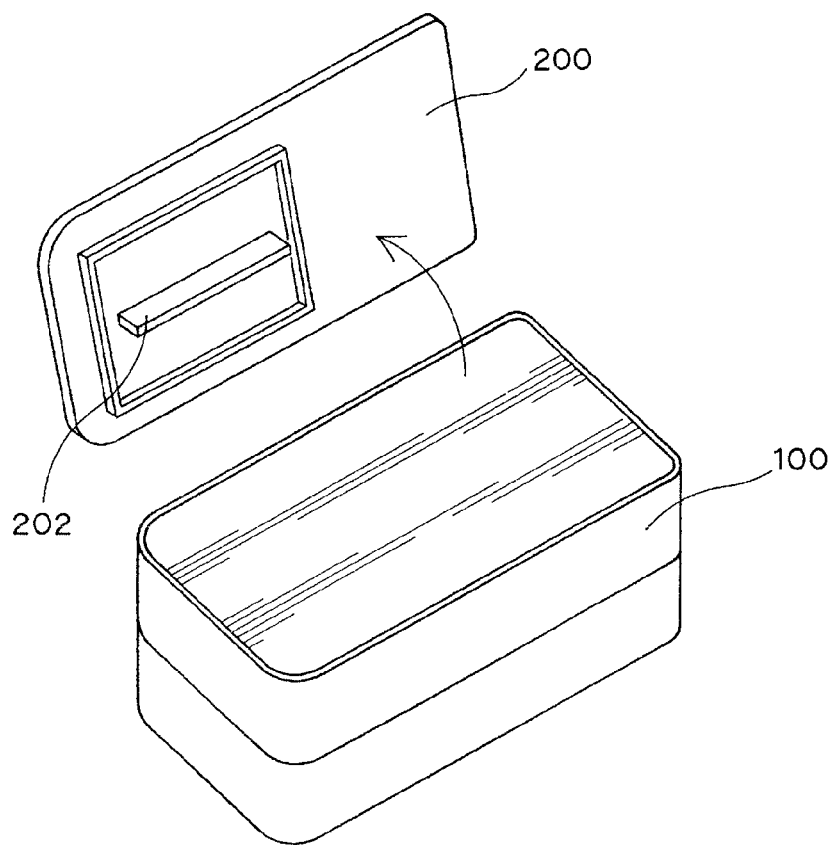
FIG. 12 is a perspective view schematically illustrating a molded article 200 obtained from the metal mold 100 illustrated in FIG. 11.

More specific embodiments of the three-dimensional shaped object of the present invention may be modified depending on a final use thereof. In a case where the three-dimensional shaped object is used as a metal mold, the specifics of the three-dimensional shaped object of the present invention may be modified depending on a shape of the molded article. As the specific three-dimensional shaped object, the three-dimensional shaped object 100 as illustrated in FIGS. 11(*a*) and 11(*b*) can be exemplified. By using such three-dimensional shaped object 100 as a metal mold, a molded article 200 as illustrated in FIG. 12 can be finally obtained. In a case of the three-dimensional shaped object 100 as illustrated in FIG. 11(*a*), the low-density sintered portion 24b is formed in a certain region including a "portion 120 where the rib of the molded article is formed" of the cavity-forming surface. As seen from the illustration of FIG. 11(*a*), the low-density sintered portion 24b has a wider face form, i.e., a form of "sheet". As for the three-dimensional shaped object 100 illustrated in FIG. 11(*b*), a plurality of low-density sintered portions 24b₁ through 24b₄ are provided such that they enclose the "portion 120 where the rib of the molded article is formed". It should be recognized that, even with such a configuration, each of the low-density sintered portions 24b₁ through 24b₄ is provided in a wider face form.

[Manufacturing Method of the Molded Article of the Present Invention]

A method for manufacturing the molded article of the present invention will be described below. The method for manufacturing the molded article according to the present invention corresponds to a method for manufacturing the molded article using the above described three-dimensional shaped object as a metal mold. The method for manufacturing the molded article comprises step (i) of injecting a raw resin material into a cavity of the metal mold, and the step (ii) of subjecting the raw resin material to a molding process in the cavity of the metal mold. Particularly according to the present invention, the pressure is applied from the outside of the cavity to the raw resin material or a molded article obtained therefrom by supplying a gas via the low-density solidified portion, and thereby an occurring of "sinking" can be prevented or reduced.

The kind of the gas used for the supply to the low-density solidified portion is not particularly limited. For example, at least one selected from the group consisting of air, nitrogen and argon may be used. An optimum value of the gas pressure applied to the low-density sintered portion varies depending on the thickness or the sintered density of the low-density sintered portion; however, the gas pressure may be typically in the range of 1 MPa to 30 MPa. If the gas pressure is too low, the supplied gas cannot flow through the low-density sintering portion, or even if the gas flows through the low-density sintering portion, the desired pressure cannot be applied to the raw resin material or the molded article. On the other hand, if the gas pressure is too high, the pressure to be applied to the raw resin material or the molded article becomes large more than necessary, causing an adverse effect on an appearance configuration of the molded article. Here, the "applied pressure with respect to the raw resin material or the molded article" can depend on the gas supply pressure and the pressure loss (i.e., pressure drop) in the low-density sintered portion. More specifically, the "applied pressure with respect to the raw resin material or the molded article" can be generally recognized by preliminarily checking the pressure loss which occurs in the low-density sintered portion, followed by deducting such pressure loss from the pressure of the gas flow. In other words, an adjustment of the pressure of the gas flow or a change of the thickness or the sintered density of the low-density sintered portion can lead to an optimum pressure for preventing the sinking phenomenon from occurring.

There are various other embodiments with respect to the methods for manufacturing the molded article according to the present invention. More detailed explanations about that will be described below.

(Embodiment of Temperature control of Molded Article)

According to this embodiment of the present invention, a temperature of the raw resin material or the molded article in the cavity is adjusted by making use of a temperature of the gas supplied to the low-density sintered portion. In other words, the adjustment of the temperature of the gas to be supplied through the low-density solidified portion can lead to a control of the temperature in the cavity of the metal mold.

According to this embodiment, the "weld phenomenon" can be effectively prevented from occurring. Specifically, when the low-density sintered portion is formed adjacent to the region where the "weld phenomenon" may occur, such occurring upon the resin molding process can be effectively suppressed by a "temperature of the gas from the low-density sintered portion". In other words, in light of the fact that the "weld" can occur at a meeting point of two flows of resin materials in the course of a cooling process, a high temperature gas is supplied to such meeting point via the low-density sintered portion so that the meeting point is locally warmed.

In a case of using the metal mold in which the low-density sintered portion is provided at a point where the sink mark tends to appear and the weld line also tends to appear, both of the "warming" and "pressure application" can be performed by supplying the high temperature gas through the low-density sintered portion in order to prevent both of the sink mark and the weld line.

(Embodiment of Pressure Applying and Suction)

According to this embodiment of the present invention, "application of pressure" is performed by the "gas supply" via the low-density sintered portion and also "suction" is performed by "gas suctioning" via the another low-density sintered portion. It is preferable to use a metal mold including a low-density sintered portion "P" and a low-density sintered portion "Q" opposing to each other. In this case, a pressure applying operation can be provided to one of the surfaces of the raw resin material or the molded article, whereas the suctioning operation can be provided to the other surface thereof. Accordingly, the "sinking" can be more effectively prevented from occurring.

(Embodiment of Pressure Applying in Injection/Pressure-keeping Process and Demold Process)

Figure 13:
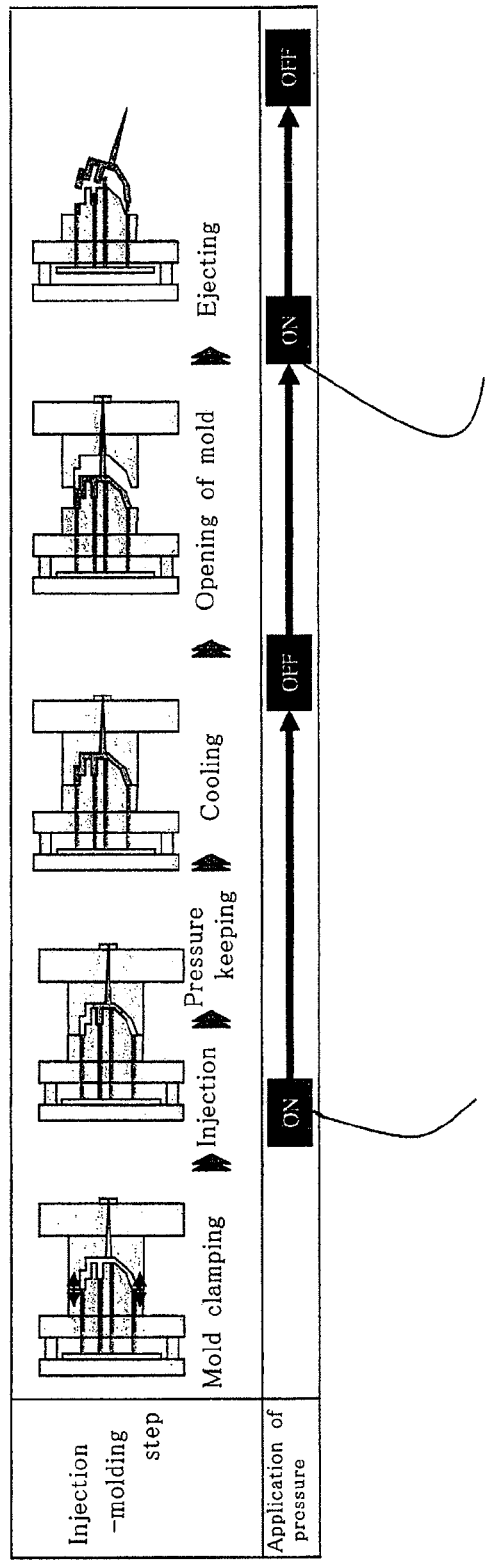
FIG. 13 is a view illustrating an operation of the resin molding process using the metal mold according to the present invention.
Figure 14:
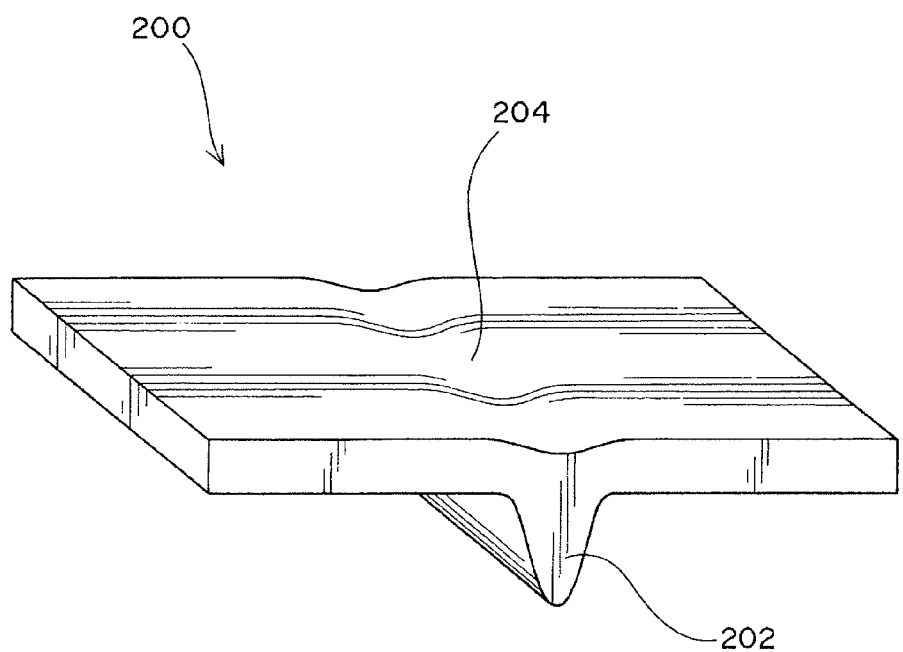
FIG. 14 is a perspective view schematically illustrating an occurring of "sinking".
Figure 15:
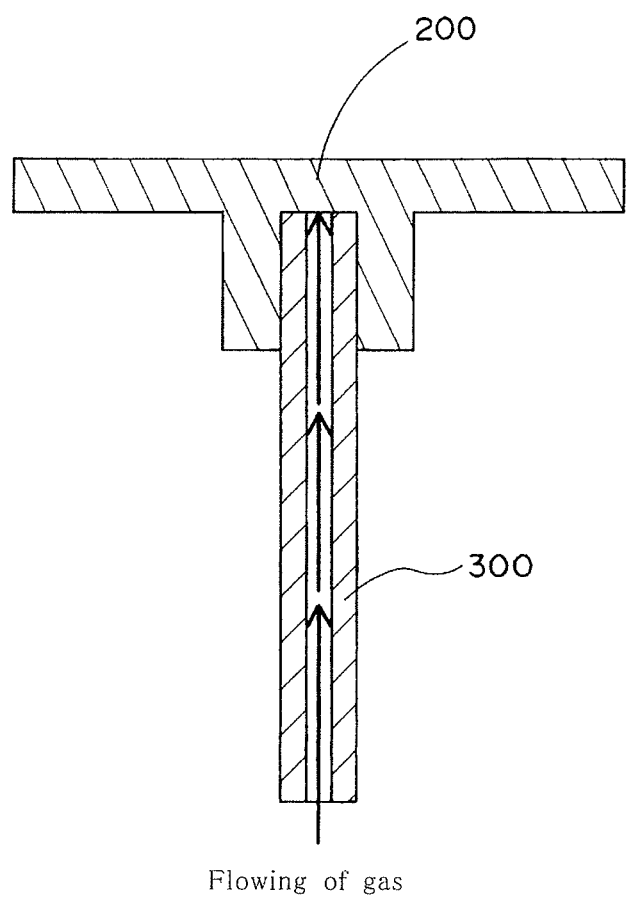
FIGS. 15(a) and 15(b) are schematic views illustrating the prior art.
Figure 15:
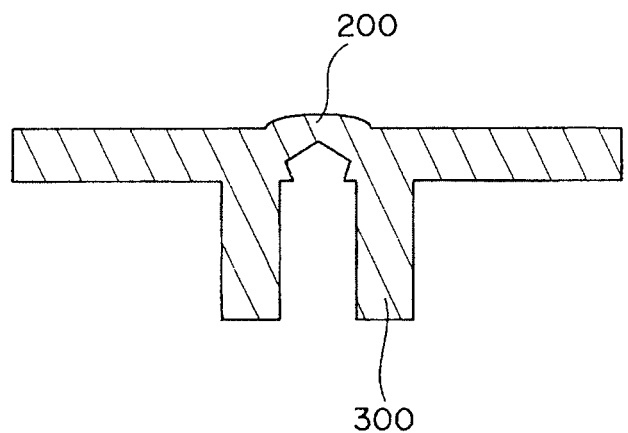

According to this embodiment of the present invention, an applying process of the gas pressure via the low-density sintered portion is performed not only in the injection molding process but also in the processes other than that. For example, the pressure applying operation is performed not only in the injection/pressure-keeping (dwelling) process, but also in the demold (mold releasing) process. For example, the pressure applying operations may be performed in a manner as illustrated in FIG. 13. According to this embodiment of the present invention, since the gas pressure can be applied to the molded article via the low-density sintered portion upon the mold releasing process, the mold releasing (demolding) of the molded article from the metal mold can be effectively assisted. In other words, without using an ejecting pin such as a "KO pin", the mold releasing (demolding) can be performed with ease. It is also advantageous in that, if the gas is supplied upon the mold releasing (demolding) process, possible clogging attributed to the residual resin or the like in the low-density sintered portion can be avoided.

It is preferred that different pressure is applied to each of the "pressure applying operation upon the injection/pressure-keeping process" and the "pressure applying operation upon the demold process". For example, pressure of 1 MPa to 30 MPa is applied to the raw resin material/molded article in the injection/pressure-keeping process, whereas pressure of 1 MPa to 20 MPa is applied to the molded article in the demold process. This can not only prevent the sinking phenomenon from occurring in the resin molding process, but also facilitate an ejection of the molded article in the demold process as well as effectively avoid the clogging in the low-density sintered portion.

Although a few embodiments of the present invention have been hereinbefore described, the present invention is not limited to these embodiments. It will be readily appreciated by those skilled in the art that various modifications are possible without departing from the scope of the present invention.

It should be noted that the present invention as described above includes the following aspects:

The first aspect: A method for manufacturing a three-dimensional shaped object, the method comprising the repeated steps of:

(i) forming a solidified layer by irradiating a predetermined portion of a powder layer with a light beam, thereby allowing a sintering of the powder in the predetermined portion or a melting and subsequent solidification thereof; and (ii) forming another solidified layer by newly forming a powder layer on the resulting solidified layer, followed by the irradiation of a predetermined portion of the powder layer with the light beam, wherein a part of a surface portion of the three-dimensional shaped object is formed as a low-density solidified portion whose solidified density ranges from 50% to 90% so that an application of pressure can be performed by a gas flowing through the low-density solidified portion.

The second aspect: The method according to the first aspect, wherein a hollow portion communicating with the low-density solidified portion is formed in the three-dimensional shaped object.

The third aspect: The method according to the first or second aspect, wherein the low-density solidified portion with its thickness of 0.5 to 10 mm is formed.

The fourth aspect: The method according to the second aspect, wherein a solidified portion connected to the low-density solidified portion is formed partially in a space of the hollow portion.

The fifth aspect: A three-dimensional shaped object obtained by the method according to any one of the first to fourth aspects, used as a core metal mold or a cavity metal mold;

wherein at least a part of a cavity-forming surface of the metal mold is provided with a low-density solidified portion whose solidified density ranges from 50% to 90%, and thereby an application of pressure with respect to a raw material for molding or a molded article can be performed by a gas flowing through the low-density solidified portion.

The sixth aspect: The three-dimensional shaped object according to the fifth aspect, further comprising a hollow portion which is in communication with the low-density solidified portion wherein the hollow portion is in communication with an outside of the shaped object.

The seventh aspect: The three-dimensional shaped object according to the fifth or sixth aspect, wherein a thickness of the low-density solidified portion is locally different.

The eighth aspect: A method for manufacturing a molded article by using of the three-dimensional shaped object obtained by the method according to anyone of the first to fourth aspects as a metal mold, or by the three-dimensional shaped object according to any one of the fifth to seventh aspects as a metal mold, the method comprising the steps of:

(i) injecting a raw resin material into a cavity of the metal mold; and (ii) subjecting the raw resin material to a molding process in the cavity of the metal mold;

wherein pressure is applied from the outside of the cavity with respect to the raw resin material or a molded article obtained therefrom by supplying a gas via the low-density solidified portion.

The ninth aspect: The method according to the eighth aspect, wherein a temperature of the raw resin material or the molded article in the cavity is controlled by making use of a temperature of the gas.

The tenth aspect: The method according to the eighth or ninth aspect, wherein the application of the pressure by the gas supply is performed in each of an injection/pressure-keeping process and a demold process, the pressure being gas pressures different from each other with respect to the injection/pressure-keeping process and the demold process.

Industrial Applicability

The produced three-dimensional shaped object obtained by the manufacturing method of the present invention can be used as various industrial articles. For example, the three-dimensional shaped object can be used as a metal mold for a plastic injection molding, a press molding, a die casting, a casting or a forging.

CROSS REFERENCE TO RELATED PATENT APPLICATION

The present application claims the right of priority of Japanese Patent Application No. 2010-132213 (filed on Jun. 9, 2010, the title of the invention: "METHOD FOR MANUFACTURING THREE-DIMENSIONAL SHAPED OBJECT, THREE-DIMENSIONAL SHAPED OBJECT OBTAINED THEREBY AND METHOD FOR MANUFACTURING MOLDED ARTICLE"), the disclosure of which is incorporated herein by reference.

The invention claimed is:

1. A method for manufacturing a three-dimensional shaped object, the method comprising repeatedly:
   forming a solidified layer by irradiating a predetermined portion of a powder layer with a light beam, thereby allowing a sintering of the powder in the predetermined portion or a melting and subsequent solidification thereof; and
   forming another solidified layer by newly forming a powder layer on the resulting solidified layer, followed by the irradiation of a predetermined portion of the powder layer with the light beam,
   wherein a part of a surface portion of the three-dimensional shaped object is formed as a low-density solidified portion whose solidified density ranges from 50% to 90% so that an application of pressure can be performed by a gas flowing through the low-density solidified portion;
   and the method further comprising:
      forming a hollow portion in the three-dimensional shaped object such that the hollow portion communicates with the low-density solidified portion; and
      forming, in a partial space of the hollow portion, a supporting solidified portion defined by a sintered portion, wherein the supporting solidified portion supports and is connected to the low-density solidified portion.

2. The method according to claim 1, wherein the low-density solidified portion with its thickness of 0.5 to 10 mm is formed.

3. A three-dimensional shaped object obtained by the method according to claim 1, used as a core metal mold or a cavity metal mold;
   wherein at least a part of a cavity-forming surface of the metal mold is provided with a low-density solidified portion whose solidified density ranges from 50% to 90%, and thereby an application of pressure with respect to a raw material for molding or a molded article can be performed by a gas flowing through the low-density solidified portion.

4. The three-dimensional shaped object according to claim 3, further comprising the hollow portion, which is in communication with the low-density solidified portion, being provided in communication with an outside of the shaped object.

5. The three-dimensional shaped object according to claim 3, wherein a thickness of the low-density solidified portion is locally different.

6. A method for manufacturing a molded article by using of the three-dimensional shaped object obtained by the method according to claim 1 as a metal mold, the method comprising:
   injecting a raw resin material into a cavity of the metal mold; and
   subjecting the raw resin material to a molding process in the cavity of the metal mold;
   wherein pressure is applied from the outside of the cavity with respect to the raw resin material or a molded article obtained therefrom by supplying a gas via the low-density solidified portion.

7. The method according to claim 6, wherein a temperature of the raw resin material or the molded article in the cavity is adjusted by making use of a temperature of the gas.

8. The method according to claim 6, wherein the application of the pressure by the gas supply is performed in each of an injection/pressure-keeping process and a demold process, the pressure being gas pressures different from each other with respect to the injection/pressure-keeping process and the demold process.

9. The method according to claim 1, comprising the supporting solidified portion being formed by a plurality of spaced apart sintered portions.

10. The method according to claim 9, wherein the plurality of spaced apart sintered portions is spaced apart at regular intervals.

11. The method according to claim 9, wherein ends of the plurality of spaced apart sintered portions support the low-density solidified portion such that the low-density solidified portion is positioned above the plurality of spaced apart sintered portions that are provided within the hollow portion.

* * * * *